United States Patent Office 3,718,926
Patented Feb. 27, 1973

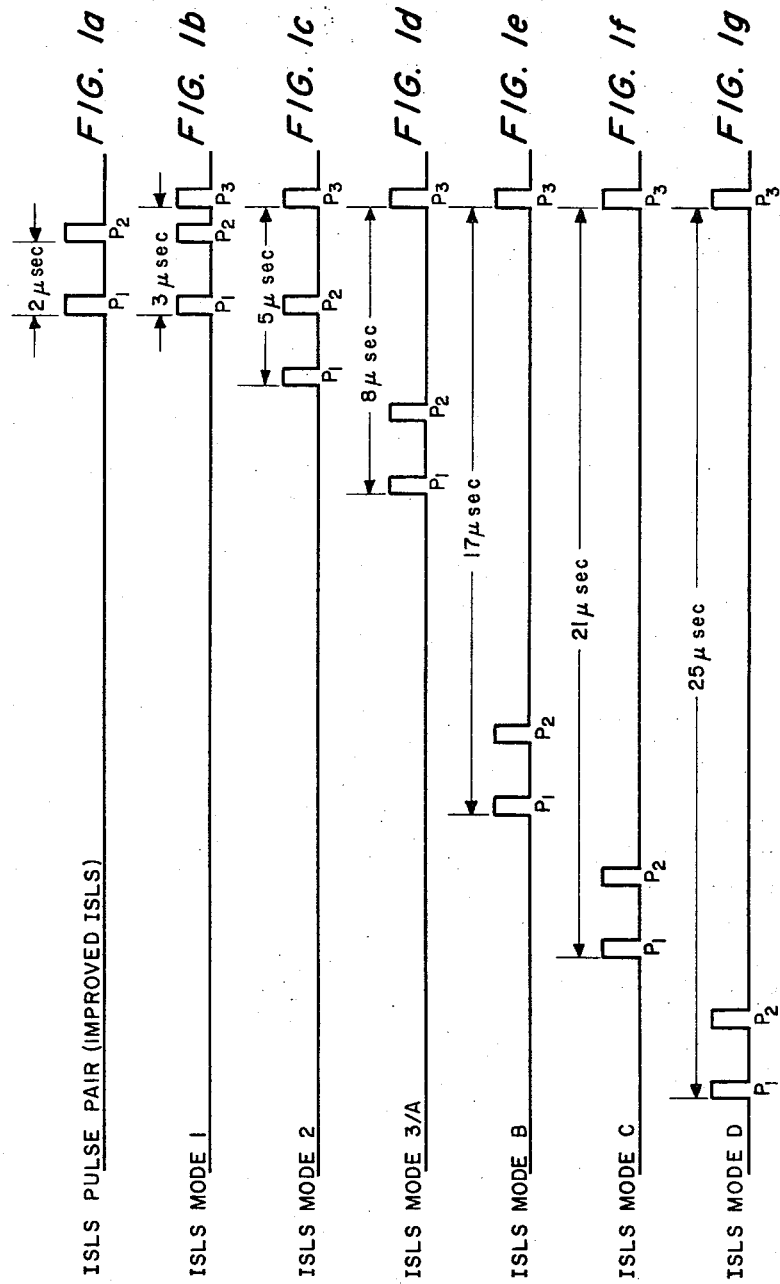

3,718,926
INSTANTANEOUS SIDELOBE INTERROGATION DECODE SUPPRESSOR
Carlyle V. Parker, Alexandria, Va., and Walton B. Bishop, Oxon Hill, Md., assignors to the United States of America as represented by the Secretary of the Navy
Filed July 31, 1970, Ser. No. 59,972
Int. Cl. G01s 9/56
U.S. Cl. 343—6.8 LC
7 Claims

ABSTRACT OF THE DISCLOSURE

A sidelobe suppression circuit for IFF transponders comprising a shift register or delay line in combination with AND gates for eliminating the current "dead-time" now experienced in IFF transponders receiving a sidelobe suppression signal.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a suppression network for use in a transponder receiving interrogation signals.

An interrogation transmitter system, when utilized with a transponder, transmits a coded signal consisting of a train of timewise spaced pulses. The coded signal generated by the interrogation system is received by the transponder and analyzed. If the pulses are of the correct frequency, amplitude and spacing, an output signal will be produced by the transponder. The interrogation system may, for example, be positioned on the ground while the transponder may be mounted in an aircraft and be utilized for identification purposes or for deriving other information such as altitude or bearing of the aircraft.

Since the transponder is triggered, or caused to transmit a reply, in response to interrogation coded signals, care must be taken to prevent false or spurious triggering of the transponder. Such undesired triggering of the transponder is usually caused by a coded pulse train signal from a sidelobe of the radiation antenna of the interrogation system. Another cause for undesired triggering has been known to occur due to echoes or reflected signals.

Current interrogation friend or foe (IFF) transponders include a suppression network to prevent triggering of the transponder due to reflected signals. The suppression period, usually 75 to 125 microseconds, that follows each reception of an interrogation causes the transponder to reject all interrogations during that period when actually only the reflected signals should be rejected.

Since all interrogations on any particular mode are essentially identical, regardless of their source or time of occurrence, it is not possible to code them so that a reflected signal can be recognized as being the same as the one just previously received.

There are two types of reflected interrogations that interfere with the operation of radar beacons. The most common type follows a path that is entirely within the main beam of the interrogator antenna. Such reflected interrogations will continue to reach the transponder until the interrogator antenna's main beam has moved off of the target (or the target has moved out of the main beam). Normally, as long as current equipment and interrogation repetition frequencies are used, each time a reflected interrogation reaches a transponder, about thirty to forty more follow. Efforts to reduce interrogation repitition frequencies should eventually reduce this number to something less than twenty, but this will not change the reflected-interrogation problem. When main-beam reflected interrogations occur, a false target, or ghost, will appear in line with the real target and at a greater range. The range difference between real and false target will be equal to the difference between the lengths of the direct-path and the indirect or reflected path between interrogator and transponder.

Transponders now in use throughout the United States and Europe reduce the effect of reflected interrogations by suppressing all transponder interrogations for about 125μ sec. immediately after receipt of a main-beam interrogation. This suppression serves to deny a response to any interrogation arriving via a reflected path, but it also denies responses to other direct-path interrogations that may arrive from other interrogators during this time interval.

A technique for preventing such reflected IFF interrogations from triggering an aircraft transponder without having this long suppression period is taught and claimed in copending patent application of Walton B. Bishop, Ser. No. 22,467, filed Mar. 25, 1970, now U.S. Pat. No. 3,646,-556. That patent application describes a technique for overcoming the effect of IFF interrogation reflections whose entire path is within the main beam of the interrogator antenna. The technique consists of measuring the time between arrival of the direct-path and the first indirect-path interrogations, and then using this information to reject succeeding indirect-path interrogations of the same delay. It thus eliminates the need for the long (125μ sec.) transponder decoder suppression periods that follow reception of a valid interrogation.

The second type of reflected interrogation that may cause trouble follows a path to a transponder that is outside of the interrogator antenna's main beam. These reflections persist for essentially the same length of time as the main-beam reflected interrogations. They also produce ghosts, but their ghosts are in line with the reflecting object rather than with any transponder.

The transponders now in use throughout the United States and Europe reduce the effect of reflected interrogations by suppressing all transponder interrogation decoders for about 35 μsec. (35±10) immediately after receiving a sidelobe interrogation so that no response can be given to a sidelobe interrogation. Recently, the Federal Aviation Administration has started equipping its interrogators with an "Improved" Interrogation Side Lobe Suppression (ISLS) technique that will cause all transponders within range but not in the main beam to be suppressed for about 35 μsec. each time an interrogation iss transmitted. This is accomplished by transmitting two pulses omnidirectionally, instead of the single pulse now transmitted for ISLS. The prime purpose of this change is to suppress reflected interrogations that reach transponders located outside of both interrogator antenna main beams and sidelobes. Even though the ISLS periods are only about 35 μsec. long, analyses have shown that they can be a serious reliability-reducing factor in those environments where large numbers of interrogators are operating. The reliability reduction could became particularly serious if large numbers of interrogator sites use the "Improved" ISLS now advocated by the Federal Aviation Administration unless firm controls over transmitter power are exercised. There is also a good possibility that the 35 μsec. suppression time now being used will not be long enough to prevent responses to non-main-beam reflected interrogations when air traffic becomes more dense. But this interval cannot be lengthened in present transponders without discriminating severely against other valid interrogations.

Reflected interrogations that reach transponders outside of the interrogator antenna's main beam can be rejected by a technique quite similar to that described in aforementioned patent application Ser. No. 22,467 for rejecting reflected interrogations that reach transponders in the main beam. As described in patent application Ser. No. 58,321, filed July 27, 1970, in behalf of Walton B. Bishop, the time between arrival of the sidelobe suppression signal and arrival of the first reflected interrogation can be measured, and then this time can be used to reject succeeding reflected interrogations from the same source until the geometry of reflection changes.

Prior art transponders, such as disclosed by Majerus et al., in Pat. No. 3,176,291 utilized a long suppression pulse upon receiving the sidelobe suppression signal. Clock, in Pat. No. 3,178,706, uses a suppression signal on the order of 30 microseconds upon receiving the sidelobe signal. There is no need to suppress the actual decoding of sidelobe interrogations in transponders as long as every successful decode is followed by a decoder suppression time that is considerably longer than the interrogation. There is a distinct advantage, however, in preventing unwanted interrogations from producing reply triggers if circuitry to reject reflected interrogations is to be used and decoder suppression times are shortened as they should be.

With a suitable technique disclosed for the prevention of reflected IFF interrogations triggering a transponder outside the main beam of the interrogating antenna without suppressing the transponder for 35 $\mu$sec., a system for preventing the transponder from responding to the sidelobe interrogation without disabling the decoder for valid interrogations proves very desirable. The suppression of sidelobe interrogations and reflected interrogations has proved very desirable. However, main-beam direct-path interrogations from other interrogators are also suppressed during this interval, and these suppressions are not desirable. They reduce the capacity and reliability of the radar beacon system.

The suppression of interrogator antenna sidelobes is essential for the operation of current radar beacon systems in order to provide adequate traffic capacity and azimuth discrimination. Also, the number of false targets continue to increase as the number of users increases and more buildings are constructed near interrogation sites. Consequently, a means of enabling transponders to reply to valid interrogations without affecting the current sidelobe suppression capability is urgently needed.

It has long been recognized that the use of long suppression periods to overcome reflections is wasteful, since it denies utilization of the transponder to other direct path interrogations that may arrive from other interrogators during the suppression period, but no satisfactory alternative could be found.

SUMMARY OF THE INVENTION

The general purpose of the invention is to provide an improved suppression network to be used in an IFF system to prevent it from responding to sidelobe interrogations. Several embodiments utilizing AND gates in combination with either a shift register or delay line are disclosed to suppress the transponder decoder momentarily upon receiving an interrogation signal, if the sidelobe suppression signal is present in the shift register or delay line.

OBJECTS OF THE INVENTION

It is therefore an object of the present invention to provide a transponder having an improved suppression network.

Another object of the present invention is to provide a transponder capable of recognizing sidelobe suppression signals.

A further object of the present invention is to provide a transponder operable without long suppression periods.

A still further object of the present invention is to provide an IFF transponder capable of responding to more valid interrogations.

Yet another object of the present invention is to increase the traffic capacity and reliability of current IFF systems.

A still further object of the present invention is to provide a way to prevent sidelobe interrogations from eliciting responses from transponders while allowing them to respond to valid direct interrogations at the same time.

Other objects, advantages and novel features of the invention will become apparent from the following detailed description of the invention when considered in conjunction with the accompanying drawings wherein:

BRIEF DESCRIPTION OF THE DRAWINGS

FIG. 1a through FIG. 1g are a series of waveforms of the Interrogation Sidelobe Suppression Signal in conjunction with the interrogation pulse for the different modes currently in use in the IFF Mark X (SIF) system.

DESCRIPTION OF THE PREFERRED EMBODIMENT

Radar beacon interrogators currently in use in the United States and Europe for air traffic control use, operate on the Air Traffic Control Radar Beacon System or IFF Mark X (SIF). The Mark X has several different modes, some for use in civilian air control and some in exclusive military use. It should be noted that the techniques to be described in this patent application can be applied with only very slight modification to the classified modes of the IFF Mark XII.

FIGS. 1a through 1g illustrate the sidelobe suppression signal $P_1$ and $P_2$ followed by the interrogation pulse $P_3$. The sidelobe suppression signal consists of a pair of pulses separated by two microseconds as shown in FIG. 1a. For those transponders in the main beam of the interrogating antenna, the $P_2$ pulse is not detected and only the $P_1$ pulse followed by the interrogating pulse $P_3$ is detected. For those transponders outside the main beam of the interrogating antenna, the current practice is to suppress the transponder decoder upon reception of the two pulses ($P_1$, $P_2$) separated by two microseconds for a period of 35 microseconds. During this interval, the transponder is unable to decode any interrogations, including those arriving in the main beam of another interrogator (without the $P_2$ pulse present). FIGS. 1b through 1g illustrate the spacing between pulses in the different modes of the IFF Mark X (SIF) system. For example, the $P_3$ pulse follows the $P_1$ pulse by 3 microseconds in the Mode 1 configuration, by 5 microseconds in the Mode 2 configuration, by 8 microseconds in the Mode 3/A configuration, by 17 microseconds in the Mode B configuration, by 21 microseconds in the Mode C configuration, by 25 microseconds in the Mode D configuration.

Figure 4:
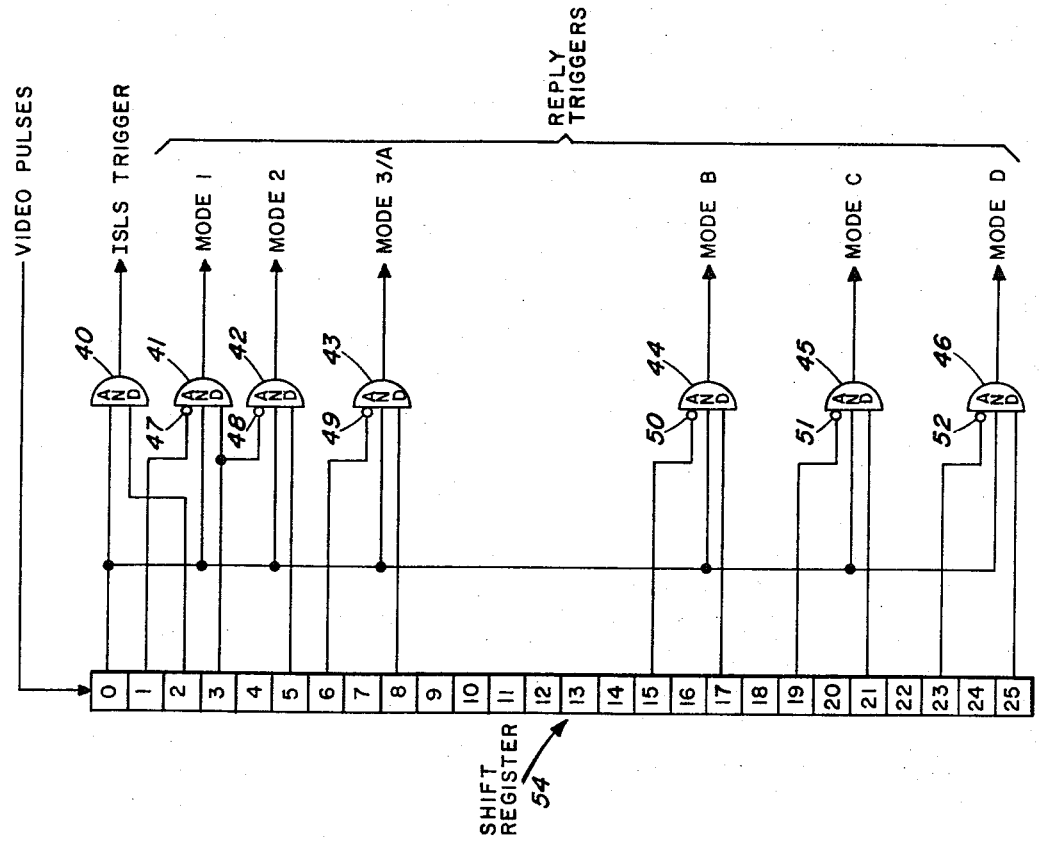
FIG. 4 is a schematic diagram of a further embodiment of the sidelobe suppression network in accordance with the principles of this invention.
Figure 2:
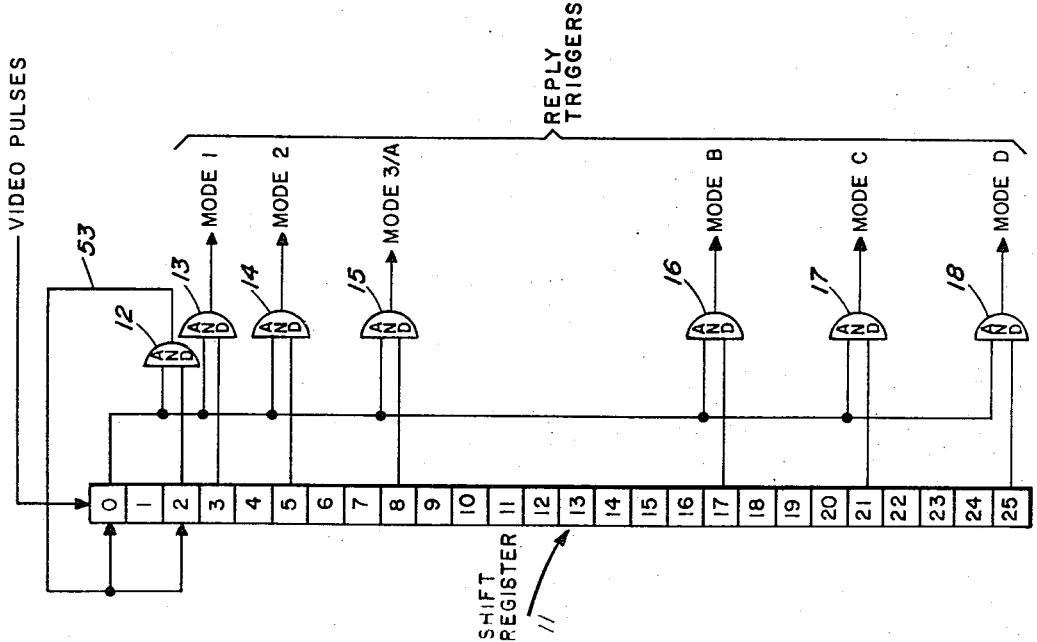
FIG. 2 is a schematic diagram of one embodiment of the sidelobe suppression network in accordance with the principles of this invention.
Figure 3:
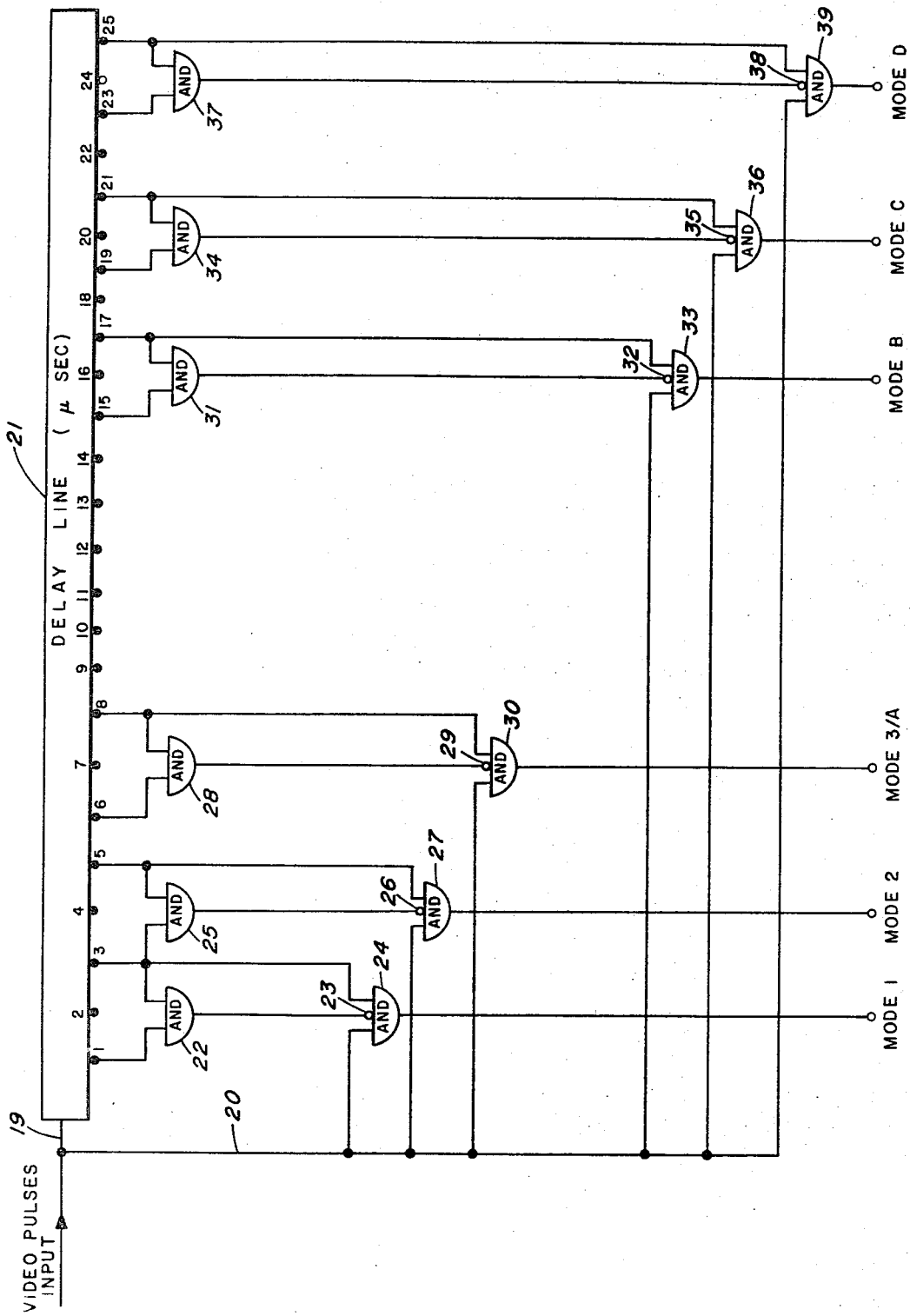
FIG. 3 is a schematic diagram of another embodiment of the sidelobe suppression network in accordance with the principles of this invention.

In order to allow a transponder to have the ability to decode main beam interrogations from other interrogations rather than disable it for a full 35 microseconds, FIGS. 2 through 4 show three embodiments on how to allow the decoder to decode valid interrogations, and yet be inhibited upon detection of a sidelobe suppression signal. More specifically, FIG. 2 shows the video pulses in the transponder being fed to a shift register 11 having 26 stages, shifting at a 1 mHz. rate. A sidelobe suppression signal, consisting of two pulses spaced by two microseconds, would result in a binary 1 in stages 0 and 2 of the shift register 11, thus enabling AND gate 12. The output from AND gate 12 is fed back to stages 0 and 2 of the shift register 11 in such a manner that it changes the binary 1 in each of these stages to a binary 0 before the next shift occurs. This is equivalent to removing $P_1$ and $P_2$ from all SIF (Mark X) codes and thus none of the sidelobe suppression signals will produce a reply trigger, while main beam interrogations will produce a reply trigger on its appropriate lead. For example, in Mode 3/A, if a sidelobe suppression signal ($P_1$ and $P_2$) were present, AND gate 12 would effectively remove $P_1$ and $P_2$ from stages 0 and 2 before they were shifted into stages 1 and 3 respectively. Thus when the $P_3$ pulse arrived in stage 0 six microseconds later, AND gate 15, having its inputs from stages 0 and 8, would not be enabled since a binary 0 would be found in stage 8. If, however, the interrogation were a main beam one, the $P_2$ pulse would not be present in stage 0 when the $P_1$ pulse was in stage 2 and thus AND gate 12 would not be enabled. The binary 1 in stage 2 would be shifted down to stage 8 when the $P_3$ pulse would be in stage 0, thus enabling AND gate 15 and eliciting a response to the interrogation. AND gates 13, 14, 16, 17 and 18 would be the equivalents to AND gate 15 for Modes 1, 2, B, C and D, respectively.

FIG. 3 shows another embodiment of the present invention. The video pulses are fed into delay line 21 via lead 19 and to AND gates 24, 27, 30, 33, 36 and 39 via lead 20. Delay line 21 is tapped at 1 microsecond intervals in such a manner that decoding in the transponder is inhibited by a sidelobe suppression signal. Thus, for example, in the Mode 2 operation, pulses simultaneously present at tap 5 ($P_1$ pulse) of delay line 21 and at the input terminal ($P_3$ interrogation pulse) of the delay line would produce an output from AND gate 27 only if there were no output from AND gate 25. If, however, there were a $P_2$ pulse also present (sidelobe suppression signal), tap 3 of delay line 21 would enable AND gate 25 and would inhibit AND gate 27 from eliciting a response to the interrogation. Lack of a $P_2$ pulse would not enable AND gate 25, thus enabling AND gate 27 to respond to the main beam interrogations. The combination of AND gates 22, 24 and inverter 23 operate similarly on Mode 1 interrogations, AND gates 28, 30 and inverter 29 on Mode 3/A interrogations, AND gates 31, 33 and inverter 32 on Mode B interrogations, AND gates 34, 36 and inverter 35 on Mode C interrogations, and AND gates 37, 39 and inverter 38 on Mode D interrogations.

FIG. 4 shows yet another embodiment of the present invention. Video pulses are fed into shift register 54. This shift register operates at a 1 mHz. rate. Due to inverters 47 through 52, the presence of a pulse exactly two microseconds following a previous pulse would inhibit all the AND gates 40 through 46 respectively from responding if there is a binary 1 ($P_3$ pulse) in stage 0 of the shift register 54. Thus, for example, in the Mode C operation, a $P_1$ pulse in stage 0 would enable AND gate 45 if stage 19 contains a binary 0 (no $P_2$ pulse present) and inhibit AND gate 45 if stage 19 indicates a binary 1 ($P_2$ pulse present).

The three embodiments disclosed above enable the transponder to be open to main beam reception of main beam interrogations just one microsecond after an ISLS pulse pair has been received, and still keeps the transponder from responding to a sidelobe interrogation. The use of this IFF interrogation would permit transponders to answer many valid interrogations that now fail to be answered because of long suppression periods. This would serve to increase the number of interrogators that could use the IFF system simultaneously without experiencing mutual interference and would automatically increase the system's reliability and anti-jam capability. Very few valid interrogations would be rejected by the one microsecond suppression intervals. The approach described above need not be limited to the Mark X (SIF) IFF system nor to the specific timewise spacing of pulses but may be applicable to certain other electronic systems that provide navigation and/or communication information.

For example, the logic circuitry in FIG. 3 could be reconfigured by Boolean algebra in a manner to be equivalent or identical to the logic circuitry of FIG. 4. The suppression signal used need not be the second of three pulses but may be a pulse at the end of an interrogation, and the logic circuitry to be connected to the delay line or shift register could be modified accordingly.

Obviously many modifications and variations are possible in light of the above teachings. It is therefore to be understood that within the scope of the appended claims the invention may be practiced otherwise than as specifically described.

What is claimed and desired to be secured by Letters Patent of the United States is:

1. In a transponder receiving IFF interrogation signals and emitting reply signals, a suppression network for suppressing reply signals to sidelobe interrogations comprising:
   means for delaying said interrogation signals;
   coincidence means for detecting the presence of two pulses spaced two microseconds apart in said delaying means whereby said reply signals are suppressed for a time duration of one microsecond; and
   means to reply to interrogation signals not having the presence of two pulses spaced two microseconds apart immediately following said time duration of one microsecond.

2. In an IFF transponder receiving interrogation signals and emitting reply signals, a sidelobe suppression network comprising:
   means for delaying said received signals;
   coincidence means for eliminating sidelobe signals in said delaying means whereby said transponder does not emit responses to sidelobe interrogation pulses.

3. A sidelobe suppression network as recited in claim 2, wherein said delaying means is a shift register and wherein said coincidence means output eliminates said sidelobe signals in said shift register.

4. A suppression network for receiving a coded interrogation signal comprising a plurality of pulses, the first and last of said pulses being spaced by a predetermined time interval, said suppression network comprising:
   delay means for receiving the first two of said pulses;
   means for indicating the presence of said second pulse separated a preselected time interval from said first pulse;
   coincidence means for precluding an output from said suppression network upon reception of said last pulse and an indication from said indicating means.

5. A suppression network as recited in claim 4, wherein said preselected time interval is two microseconds and said second pulse indicates that the signal is a sidelobe interrogation.

6. A sidelobe suppression network as recited in claim 5 wherein said delay means is a delay line.

7. A sidelobe suppression network as recited in claim 5 wherein said delay means is a shift register.

References Cited

UNITED STATES PATENTS 3,176,291  3/1965  Majerus et al. ___ 343—6.8 LC
3,007,156  10/1961  Barber _____ 343—6.8 LC THEODORE H. TUBBESING, Primary Examiner U.S. Cl. X.R.

343—6.5 R